United States Patent

[11] 3,572,821

[72] Inventor Danial Roe Van Antwerp
     R.R. #1, Mystic, Iowa 52574
[21] Appl. No. 846,342
[22] Filed July 31, 1969
[45] Patented Mar. 30, 1971

[54] COVER FOR TRUCK BEDS
7 Claims, 5 Drawing Figs.
[52] U.S. Cl. ................................................. 296/137,
     16/147
[51] Int. Cl. .................................................. B60j 7/10
[50] Field of Search ........................................ 296/100,
     137; 292/31, 101, 120, (TC), 262; 49/382, 465,
     395; 16/147

[56] References Cited
UNITED STATES PATENTS
2,572,630  10/1951  Krause ........................  16/147
2,886,375   5/1959  Crawford ....................  296/100
3,012,814  12/1961  Penner ........................  296/100

*Primary Examiner*—Benjamin Hersh
*Assistant Examiner*—Robert R. Song
*Attorneys*—Haven E. Simmons and James C. Nemmers ABSTRACT: A removable cover for pickup truck bed is disclosed. The cover includes a rigid frame with stakes, the frame seating upon the top edges of the bed and the stakes fitting into recesses typically provided therein for that purpose. A pair of catches carried wholly by the cover along each side thereof engage the flanges typically provided along the two sides of the truck bed, the catches along each side being conjointly operated by a crankshaft. The catches are spring biased to resiliently hold the cover to the bed, and at the same time, when the two catches along one side of the cover are released, to permit that side to be lifted against the spring pressure of the two catches along the other side. Additionally, the catches may be designed so that the rear two only may be released, whence the rear of the cover may be lifted against the spring pressure of the front two catches.

*INVENTOR.*
DANIAL ROE VAN ANTWERP
BY
*ATTORNEY*

INVENTOR.
DANIAL ROE VAN ANTWERP

COVER FOR TRUCK BEDS

BACKGROUND OF THE INVENTION

Prior pickup truck bed covers of the removably fastenable type typically require some permanent attachments to the truck bed in order that they may function, an example being shown in U.S. Pat. No.2,886,375 to Crawford. This is undesirable as such attachments may not only interfere with other use of the bed when the cover is removed but also interfere with ready transfer of the bed cover from one truck to another. The latter aspect is important because the beds of equivalently rated pickup trucks are usually substantially identical in size and structure so that a bed cover of one truck ought easily to be transferable to another with at the most, only slight modification. At the same time, the fastening mechanism should be as simple, rugged and unobtrusive as possible. These are the objects and features of the present invention which takes advantage of the typical construction of the beds of current pickup trucks to provide a securely fastened, easily removable and transferable bed cover requiring no permanent attachments to the truck bed in order for it to function effectively.

SUMMARY OF THE INVENTION

Essentially, the present invention employs a rigid bed cover having a simple inner framelike structure, the latter carrying several depending stakes to fit within the recesses therefore typically provided along the top side edges of modern pickup truck beds, the frame itself sitting on the top edges of the front and sidewalls of the bed. A lower lip at the rear end of the cover overlaps the tailgate, thus holding it closed, or the tailgate may be left open so that long objects, such as lumber, can be loaded. Along each side of the frame and journaled therein is a crankshaft which protrudes from the rear of the cover and is fitted with a handle by which it may be rotated. Spaced along each such shaft are two crankpins, each of which operates one of a pair of catches to retain the cover upon the bed.

Each catch comprises a tubular spring housing, one of the crankpins extending transversely through an axially extending, diametrical slot in the upper end of the housing. To each crankpin is attached the upper end of an extensible coil spring disposed under tension in the housing, the lower end of the spring being attached to the lower end of the housing. The lower end of the latter is also provided with a hook-like member effective, upon rotation of the crankpins by the crankshaft, to move laterally under and then up to engage the down-turned flange, with which such beds are typically equipped, along the inner top edge of its adjacent bed sidewall. Further rotation of the crankshaft causes the spring to be still further extended, so that the hook is tightly engaged with the flange, until the crankpin passes "overcenter," a stop and the edges of the slot in the housing preventing further rotation of the crankshaft, whence the spring is locked in its extended position and the cover maintained tightly seated upon the top of the bed. Rotating the crankshaft the other way permits the spring to contract and the housing and hook to be swung down and laterally away from under the flange.

Releasing only one side of the cover allows that side to be lifted for access to the bed, the springs of the other side of the cover permitting that side to rise while the hooks thereof remain tightly engaged with the adjacent flange of the bed. When the cover is lifted at one side, the tailgate may also be lowered. By fashioning the hook members of the front pair of catches longer than those of the rear pair, the latter pair will release from the bed flanges before the former pair, whence the rear of the cover only may be raised and the front pair of catches relocked. When the cover is removed entirely, no fittings remain attached to the bed.

DESCRIPTION OF THE PREFERRED EMBODIMENT

Figure 1:
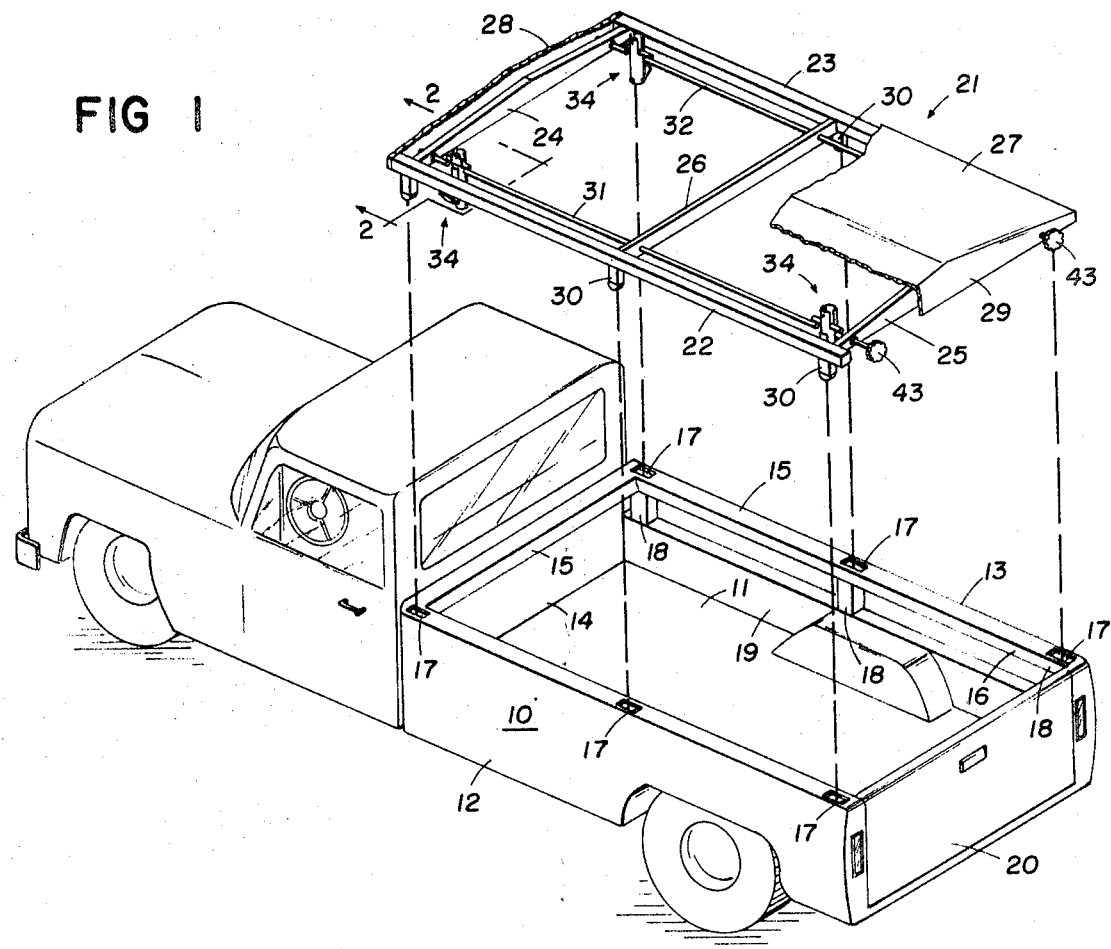
FIG. 1 is an upper isometric view of a typical pickup truck showing a bed cover according to the present invention in exploded relation to the truck bed.

FIG. 1 illustrates a rectangular bed 10 of a typical pickup truck having a floor 11, sidewalls 12 and 13 and a front wall 14, the tops of each having a flat seat 15 thereabout formed by a horizontal portion of an inwardly extending, downturned ledge or flange 16. As is customary, along each sidewall 12 and 13 the seats 15 thereof are rectangularly apertured at its two ends and midpoint to provide three recesses 17 in which to receive bed stakes which extend down into hollow supports 18 secured between the seats 15 and inner sidewall panels 19 therebelow. A typical tailgate 20, flush with the seats 15, is hinged at its lower margin to the rear end of the floor 11.

The bed cover, generally designated at 21, includes a generally rectangular frame congruent with the top plan of the bed 10 having side rails 22 and 23 and end pieces 24 and 25, all with flat underfaces to sit upon the seats 15 and the top of tailgate 20, the side rails 22 and 23 also having an intermediate cross brace 26 therebetween. The end pieces 24 and 25 may be apexed midway along their upper edges to receive a generally pyramidal shaped top plate 27, of any suitably rigid material such as aluminum, having a front end plate 28 sitting atop the seat 15 of the front wall 14 and a rear end plate 29 overlapping the tailgate 20, locking the latter in its closed position. From the lower face of each side rail 22 and 23 adjacent its two ends and at its midpoint depend three short, rectangular stakes 30 disposed therealong to engage the respective recesses 17 in order to locate the cover 21 atop the bed 10. The stakes 30, however, are sufficiently slender and tapered to permit the cover to be tilted at one side, as shown in FIG. 5, as well as to be self-aligning on the bed 10.

Figure 3:
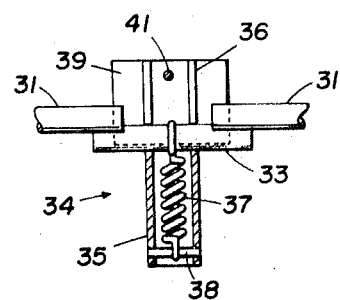
FIG. 3 is a detailed view taken along the line 3-3 of FIG. 2.

The cover fastening mechanism comprises a pair of crank shafts 31 and 32 journaled in the end pieces 24 and 25 and the brace 26 parallel to and adjacent the inboard faces of the respective side rails 22 and 23. Each crankshaft 31 and 32 consists of three axially aligned rods spaced end-to-end and a pair of axially aligned crank pins 33 welded in offset, overlapping relation therebetween (see FIG. 3) just aft and forward of, respectively, the forward and rear stakes 30 along each side of bed 10. The catches, generally indicated at 34, are operated by the crankpins 33 and each comprise a generally upright tubular metal housing 35 having an axially extending, diametrical slot 36 in its upper half opening through its upper end, the slot 36 having a width equal to the diameter of a crankpin 33 and receiving the latter therethrough. Each housing 35 is retained on its crankpin 33 by means of an extensible coil spring 37 under tension hooked at its upper end over the crankpin 33 in a circumferential groove therein which frictionally engages the upper end of spring 37 so that the latter does not rotate relative to the crankpin 33 nor slip lengthwise therealong. The lower end of spring 37 is hooked over an anchor pin 38 transversely through the lower end of the housing 35. Across the upper outboard wall of the forward pair of housings 35 is welded a transverse metal plate forming a stop 39 for purposes to be described. A hook member 40, bent from a stout piece of metal strap or the like and having an upturned nose 40a, is welded to the lower outboard wall of each housing 35 so that it extends laterally toward the adjacent bed sidewall 12 or 13, as the case may be, and beneath its respective flange 16, the lateral extent of the forward pair of hooks 40 being greater than that of the rear pair. The upper end of the slot 36 of each housing 35 is provided with a transverse safety pin 41, for purposes to be described. The outboard walls at the upper ends, and the inboard walls at the lower ends, of housing 35 are fitted with resilient bumpers 42. The rear ends of crankshafts 31 and 32 extend beyond the face of the rear end plate 29 and are fitted with appropriate handles 43. Gaskets 44 are provided on the lower faces of side rails 22 and 23, the rear end piece 25 and the front end plate 28 of cover 21 to seal them against the seats 15 and the tailgate 20.

Figure 2:
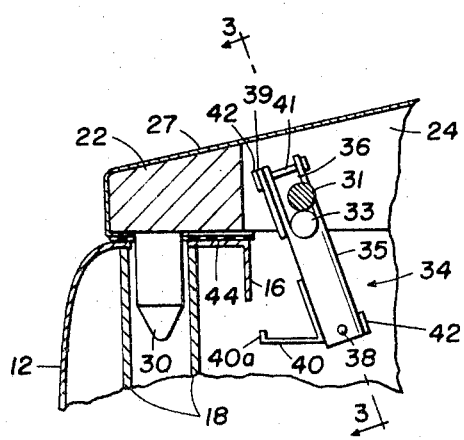
FIG. 2 is a detail view taken along the line 2-2 of FIG. 1 showing the position of one of the two catches at the front of the cover in its released position.
Figure 4:
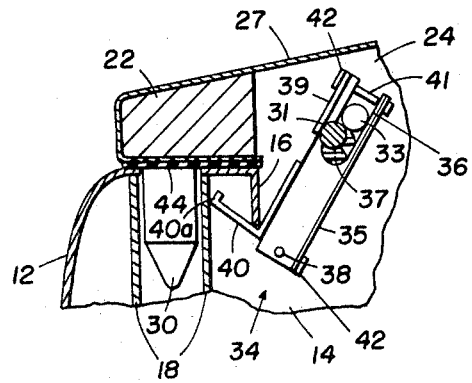
FIG. 4 is similar to FIG. 2 but shows the catch in its engaged and locked position.

To apply the cover 21, first the crankshaft 31 is rotated counterclockwise and the crankshaft 32 clockwise by the handles 43. Then the cover 21 is placed in position atop the bed 10 with the tapered stakes 30 engaging the recesses 17. As will be observed, the foregoing rotations of crankshafts 31 and 32 cause the crankpins 33 both to lower the housings 35 and also, owing to the aforesaid frictional engagement between the crankpins 33 and the upper ends of springs 37, to swing the housing 35 about the axes of crankshafts 31 and 32 away from the adjacent flanges 16. In the foregoing position the catches 34 are in their released positions, as shown in FIG. 2, with the crankpins 33 in the bottoms of their slots 36. Thus the hooks 40 clear the flanges 16 and permit the cover 21 to be lowered to engage the gaskets 44 with the seats 15 of the walls of bed 10. Then the handles 43 are rotated in their respective opposite directions, whereupon the crankpins 33 swing the housings 35 about axes of crankshafts 31 and 32 toward their respective flanges 16 and at the same time raise them so that the hooks 40 engage the lower edges of the flanges 16. Continued rotation of the handles 43 causes the crankpins 33 to rise in their slots 36, resulting in further extension of the springs 37, until the crankpins 33 pass up "overcenter" with respect to the axes of crankshafts 31 and 32. At this point, the crankshafts 31 and 32 contact the stops 39 and the crankpins 33 press against the inboard pairs of edges of the slots 36 of the forward pair of housing 35, thus preventing further rotation of crankshafts 31 and 32 and so "locking" the catches 34 in the position shown in FIG. 4. The cover 21 is thereby tightly retained against the tension of the spring 37. The safety pins 41 prevent the catches 34 from flying off the crankpins 33 should the springs 37 break for some reason and the bumpers 42 prevent rattling of the catches 34 when released against the adjacent flanges 16 and side rails 22 and 23.

Figure 5:
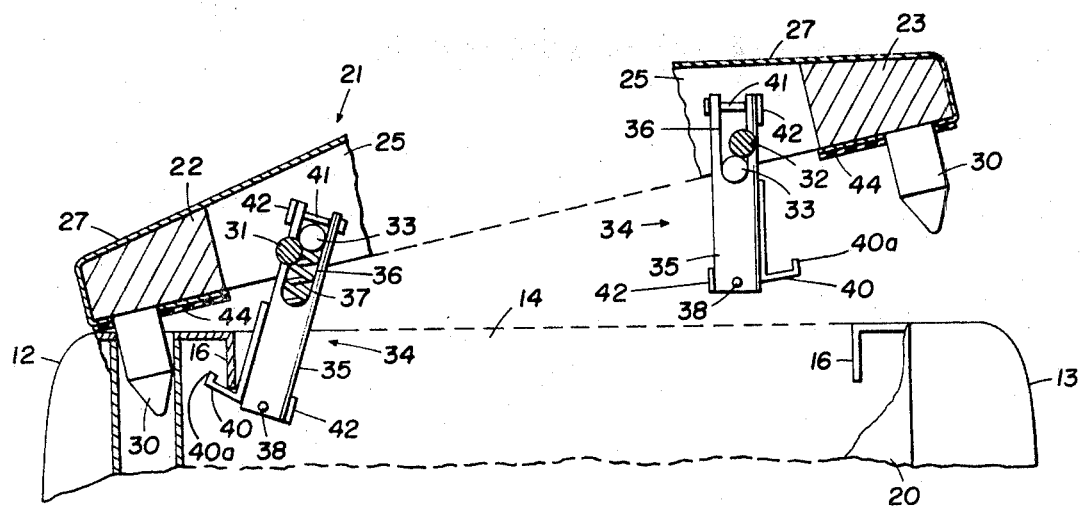
FIG. 5 is a truncated rear end view of the pickup truck bed, partly in section, showing the rear pair of catches with the bed cover released and elevated along one side thereof only.

If access to the bed 10 through one side of the cover 21 is desired, the latter side can be released in the foregoing manner and lifted, as shown at the right-hand side of FIG. 5, the axial length of the slots 36 being sufficient to allow further extension of the springs 37 of the left-hand side, owing to the rise of the end pieces 24 and 25, before the left-hand crankpins 33 contact their respective safety pins 41. The latter thus also function under these conditions to limit the amount of rise of the right-hand side and to prevent over extension of the springs 37 of the left-hand side. Hence, the cover 21 can be readily applied, removed or tilted simply upon appropriate rotations of the handles 43, which may also be provided with suitable locks to prevent unauthorized access to the bed 10. In the same vein, the upturned noses 40a of hooks 40 prevent a bar, for instance, inserted between bed 10 and cover 21, from being able to push or pry the hooks 40 off the flanges 16. If it is desired to lift the rear end only of cover 21, all four catches 34 are first released but the crankshafts 31 and 32 are rotated only enough for this purpose for the rear, but not the front, pair of hooks 40 to disengage the flanges 16, this being possible owing to the greater lateral extent of the forward pair of hooks 40. The rear end of cover 21 is then lifted and may be supported by suitable struts or braces (not shown). Thereafter, the crankshafts 31 and 32 are rotated in the opposite directions to lock the forward pair of catches 34, thus retaining the front end of cover 21 tightly on the bed 10 in the same manner as is the left-hand side of cover 21 when the right-hand side is lifted as shown in FIG. 5. Upon complete removal of cover 21, no fittings remain behind on the bed 10.

While the present invention has been described in terms of a particular embodiment thereof, being the best mode presently known of carrying out the invention and detailed descriptive language has been used, it is not so limited. Instead, the following claims are to be read as encompassing all adaptions and modifications of the invention falling within the spirit and scope thereof.

I claim:

1. In a removable cover to close over the open bed of a pickup truck of the type having a pair of opposite sidewalls with overhanging ledge portions on the inner faces thereof adjacent their top edges, said cover having a pair of opposite side members engageable with the top edges of the sidewalls of the bed when said cover is operatively disposed thereover, the improvements in said cover comprising: means carried by said cover effective to secure said cover side members to the top edges of the sidewalls of the bed, said securing means including a pair of crankshafts disposed in side-by-side relation to respective ones of said cover side members and journaled for rotation in said cover, each of said crankshafts having at least one pair of crankpins disposed therealong adjacent the forward and rear ends of said cover, each of said crankpins carrying a catch assembly comprising an extensible spring anchored at one end to said crankpin and at its other end to hook means carried by and extending transversely from said crankpin, rotation of said crankshaft in one direction causing said crankpin to move said hook means laterally from a released position toward and under the adjacent ledge portion of the bed when said cover is operatively disposed thereon, further rotation of said crankshaft in said direction first elevating both said crankpin and said hook means relative to the axis of said crankshaft until said hook means engages said ledge portion and thereafter extending said spring until said hook means has reached a locked position in which said crankpin has passed its uppermost position relative to the axis of said crankshaft, said hook means in its locked position being retained therein by stop means preventing further rotation of said crankshaft in said direction.

2. The cover of claim 1 wherein each of said hook means includes a generally upright tubular housing containing said spring, said spring being anchored at its lower end to said housing, said housing having a transverse, axially extending slot in its upper portion receiving said crankpin transversely therethrough, said crankpin being disposed in the lower portion of said slot when said hook means is in its released position and in the upper portion of said slot when said hook means is in its locked position.

3. The cover of claim 2 including means resisting rotation of said crankpin relative to said housing, whereby said housing is swingable about the axis of said crankshaft upon rotation thereof.

4. The cover of claim 3 wherein each of said springs is in an extended position when its respective hook means is in its released position, said resisting means comprising frictional engagement between the upper end of said spring and said crankpin owing to said spring extension.

5. The cover of claim 2 wherein the axial extent of each of said slots is sufficient to accommodate further extension of each of said springs when said catch assemblies along one side of said cover are in their locked positions, said catch assemblies along the other side of said cover are in their released positions and said other side of said cover is elevated relative to the bed, and including means carried by said housings and disposed at the upper end of each of said slots to prevent still further extension of said springs.

6. The cover of claim 5 wherein the transverse extent of said hook means of the forward pair of said catch assemblies is greater than the transverse extent of the rear pair of said catch assemblies, whereby the rear pair of said catches are in their released positions before the forward pair of said catch assemblies upon rotation of said crankshafts.

7. The cover of claim 6 wherein the bed includes a plurality of downwardly extending recesses in the tops of the sidewalls thereof, and wherein said cover includes a plurality of depending stakes fixed to said side members effective to fittingly engage the recesses and locate said cover horizontally relative to the bed, said stakes being downwardly tapered effective to permit one side or the rear end of said cover, when only the catch assemblies along said side or end, respectively, are in their released positions, to be elevated relative to the bed.